(Model.)
H. C. GOODRICH.
DEVICE FOR ATTACHING PRESSER FEET AND OTHER ATTACHMENTS TO SEWING MACHINES.
No. 333,004. Patented Dec. 22, 1885.
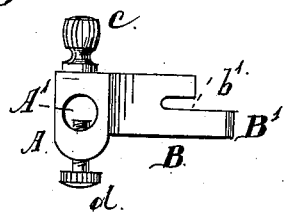
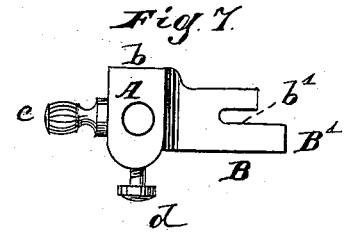
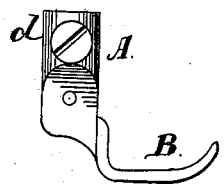
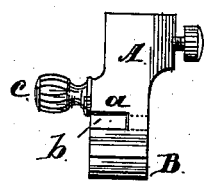
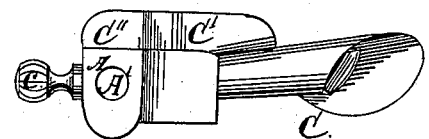
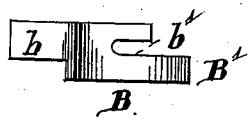
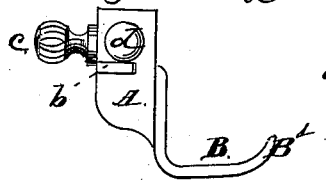
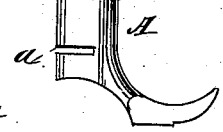
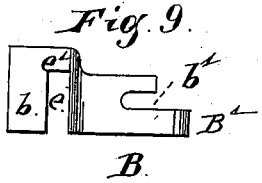
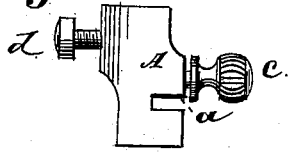
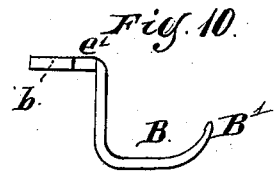
Witnesses:
F. F. Bruns.
Albert N. Adams.
Inventor:
Harry C. Goodrich,
By West & Bond,
His attys.
N. PETERS, Photo-Lithographer, Washington, D. C.

UNITED STATES PATENT OFFICE.

HARRY C. GOODRICH, OF CHICAGO, ILLINOIS.

DEVICE FOR ATTACHING PRESSER-FEET AND OTHER ATTACHMENTS TO SEWING-MACHINES.

SPECIFICATION forming part of Letters Patent No. 333,004, dated December 22, 1885.

Application filed December 24, 1883. Serial No. 115,469. (Model.)

*To all whom it may concern:*

Be it known that I, HARRY C. GOODRICH, residing at Chicago, in the county of Cook and State of Illinois, and a citizen of the United States, have invented a new and useful Improvement in Devices for Attaching Presser Feet and other Attachments to Sewing-Machines, of which the following is a full description, reference being had to the accompanying drawings, in which—

Figure 1 is a top or plan view; Fig. 2, a side elevation; Fig. 3, a rear elevation; Fig. 4, a detail, being a top or plan view of the detachable foot; Fig. 5, a side elevation of the same; Fig. 6, a front elevation of the clamping-head; Fig. 7, a top or plan view showing a modification in the manner of attaching; Fig. 8, a side elevation of the devices shown in Fig. 7; Figs. 9 and 10, details, being respectively a top view and side elevation of the form of detachable foot shown in Fig. 7; Fig. 11, a top or plan view showing a hemmer and the mode of attaching it; and Fig. 12, a side elevation showing the form of clamping-foot for the use shown in Fig. 11.

It is the practice in working on sewing-machines to use different styles of presser-feet on the same machine for different kinds of work, and as heretofore constructed each presser-foot has to have the foot proper and a head or shank by which it is connected to the presser-foot bar.

The primary object of this invention is to enable different-sized feet to be used as required without the necessity of taking off the shank or attaching portion from the presser-foot bar; and it further relates to devices for enabling this object to be readily and quickly attained, which devices are also applicable for the ready attachment and removal of other forms of sewing-machine attachments; and its nature consists in providing a slotted head or shank which can be applied to the presser-bar, and combining therewith a presser-foot or other attachment having an arm or support to enter the slot, and be firmly locked therein through the medium of a set-screw or other device, all as hereinafter more specifically described, and pointed out in the claims.

In the drawings, A represents the head or shank, which may be made or cast from brass or other suitable material, to have a central longitudinal opening, A', to receive the end of the presser-bar, to which end the head or shank can be firmly locked by means of a set-screw, *d*. As shown in Figs. 3 and 6, this head or shank A is provided with a slot or recess, *a*, on one side, above which, and co-acting therewith, is a set-screw, *c*, which set-screw is arranged in such relation with the slot as to have a biting portion or end face, which projects a little below the upper line of the slot, as shown in Figs. 3 and 6.

As shown in Fig. 8, the head or shank A is provided with a recess or slot, *a*, on its rear face instead of on its side, with which recess or slot a set-screw, *c*, acts in the same manner as with the side slot. The slot *a* is to be of sufficient width and depth for the dimensions of the arm or support which is to be locked therein.

B is the presser foot, having, as shown in the figures, one side made longer than the other, with the ordinary slot, *b'*, between the parts for the passage of the needle. The vertical part of this presser-foot has at its upper end a horizontal portion, *b*, forming the arm for attaching the foot to the head or shank, which arm is slipped into the slot *a*, and the set-screw *c* set down, impinging and holding the arm between the end of the slot and the end face of the screw-head, as shown in Fig. 3, and when the parts are together, as shown in Fig. 2, the presser-foot will be connected to the head or shank and be as rigid and strong as though formed therewith, and at the same time it can be readily removed by simply unloosening the set-screw *c* and withdrawing the arm *b* from the slot *a*. This form of construction pertains to the head or shank having a slot on its side face, and when such head or shank has the slot on its rear face the arm *b* of the presser-foot will be turned at right angles, so as to lie parallel with the end of the foot, as shown in Fig. 9, with an opening, *e*, between the arm and the vertical portion of the foot, having at one side a solid portion, *e'*, which abuts against the side face of the head or shank, while the arm *b* passes into the slot *a*, and the parts are locked by the set-screw *c*, as shown in Fig. 8. The head or shank is to be attached to the end of the presser-bar and locked firmly thereto by the set-screw *d*, and remains in that position; but the presser-foot is made detachable, allowing the ready removal of one form of foot and its replacement by another, and when the foot is in position and locked by the set-screw the union between it and the head or shank is one which is very firm and strong, possessing the necessary rigidity and firmness for use. This arrangement, although primarily designed for the interchanging of different styles of presser-feet, can also be used for the attachment of other devices, and Figs. 11 and 12 show a foot in connection with a hemmer attached thereto by means of a set-screw and an arm or shank.

C represents a plate-hemmer, of the usual construction, attached to an arm, C', the end C'' of which is bent at right angles and enters the slot $a$ in the head or shank, where it is secured by the set-screw $c$ in the manner already described for securing the presser-foot, and, as shown in Fig. 12, the head or shank and the presser-foot are made of a single piece, which is desirable when the head or shank and the foot are to be used in connection with a hemmer or other attachment; but it is evident that a detachable foot might be used by simply countersinking the portion $b$ to a depth sufficient for the thickness of the arm which carries the attachment to be used with the foot.

What I claim as new, and desire to secure by Letters Patent, is—

1. A head or shank, A, having a horizontal slot, $a$, behind the needle-hole, in combination with a presser-foot or other attachment having a flat attaching-shank secured in said slot $a$ by the head of a set-screw, substantially as described.

2. The attachment-holder provided with a socket for attaching the same to the presser-bar of a sewing-machine, and having a transverse groove therein behind the needle-hole, in combination with the series of attachments having each a flat attaching-plate of a size and shape to fit in said groove, and a holding-screw tapped into said holder and arranged to bind or bear against the edge of said plate to prevent removal of the attachment, substantially as described.

3. The attachment-holder in the form of a presser-foot, having a horizontal transverse groove therein behind the needle-hole, in combination with the series of attachments having each a flat horizontal attaching-plate of a size and shape to fit in said groove, and the holding-screw tapped into said holder from the rear and arranged to bear against the rear edge of the attaching-plate inserted in the groove, substantially as described.

HARRY C. GOODRICH.

Witnesses:
ALBERT H. ADAMS,
O. W. BOND.